US012691411B2

(12) United States Patent　　　(10) Patent No.:　US 12,691,411 B2
Tadiello et al.　　　　　　　　(45) Date of Patent:　　Jul. 28, 2026

(54) PLANT AND METHOD FOR CARRYING OUT AN ENDOTHERMIC CHEMICAL PROCESS AND FOR SEPARATING CARBON DIOXIDE FROM FLUE GAS PRODUCED IN THE PROCESS

(71) Applicant: L'Air Liquide, Société Anonyme pour l'Etude et l'Exploitation des Procédés Georges Claude, Paris (FR)

(72) Inventors: Jean-Philippe Tadiello, Frankfurt am Main (DE); Teja Schmid McGuinness, Frankfurt am Main (DE); Alexander Haenel, Frankfurt am Main (DE)

(73) Assignee: L'Air Liquide, Societe Anonyme Pour l'Etude et l'Exploitation des Procedes, Georges Claude Paris (FR)

( * ) Notice: Subject to any disclaimer, the term of this patent is extended or adjusted under 35 U.S.C. 154(b) by 585 days.

(21) Appl. No.: 18/121,347

(22) Filed: Mar. 14, 2023

(65) Prior Publication Data

US 2023/0285896 A1　　Sep. 14, 2023

(30) Foreign Application Priority Data

Mar. 14, 2022　(EP) ..................................... 22161775

(51) Int. Cl.
B01D 53/75　　　(2006.01)
B01D 53/14　　　(2006.01)
(Continued)

(52) U.S. Cl.
CPC ......... B01D 53/75 (2013.01); B01D 53/1406 (2013.01); B01D 53/1425 (2013.01);
(Continued)

(58) Field of Classification Search
None
See application file for complete search history.

(56) References Cited

U.S. PATENT DOCUMENTS 5,199,263 A　　4/1993　Green et al.
2007/0009426 A1*　1/2007　Leveson ................ B01J 12/007
　　　　　　　　　　　　　　　　422/211

(Continued)

FOREIGN PATENT DOCUMENTS

CA　　2 634 254　　7/2007
WO　WO 01 61245　　8/2001

OTHER PUBLICATIONS

Attari et al., "Sampling and Analysis of Natural Gas Trace Constituents." Inst. of Gas Tech (Sep. 1993).*
(Continued)

*Primary Examiner* — Daniel Berns
(74) *Attorney, Agent, or Firm* — Elwood L. Haynes

(57)　　　ABSTRACT

The plant according to the invention includes a reactor including a combustion chamber in which a fuel is fired with an oxidant to form a carbon dioxide-containing flue gas stream. The plant also includes a waste heat recovery unit in fluid connection with the combustion chamber, configured to capture heat from the flue gas stream. The plant also includes a flue gas compression unit in fluid connection with the waste heat recovery unit, configured to increase the pressure of the flue gas stream. The plant also includes a scrubber in fluid connection with the flue gas compression unit, configured to remove sulphur oxides and/or nitrogen oxides from the flue gas stream and to cool flue gas stream by means of the scrubbing medium. The plant also includes an absorption unit in fluid connection with the scrubber, configured to absorb carbon dioxide from the flue gas stream.

9 Claims, 3 Drawing Sheets

(51) Int. Cl.

| | |
|---|---|
| *B01D 53/18* | (2006.01) |
| *B01D 53/34* | (2006.01) |
| *B01D 53/62* | (2006.01) |
| *B01D 53/78* | (2006.01) |
| *B01D 53/96* | (2006.01) |
| *F23J 15/00* | (2006.01) |
| *F23J 15/02* | (2006.01) |

(52) U.S. Cl.
CPC ..... *B01D 53/1475* (2013.01); *B01D 53/1481* (2013.01); *B01D 53/18* (2013.01); *B01D 53/343* (2013.01); *B01D 53/346* (2013.01); *B01D 53/62* (2013.01); *B01D 53/78* (2013.01); *B01D 53/96* (2013.01); *F23J 15/006* (2013.01); *B01D 2257/302* (2013.01); *B01D 2257/404* (2013.01); *B01D 2257/504* (2013.01); *B01D 2258/0283* (2013.01); *F23J 15/02* (2013.01); *F23J 2215/50* (2013.01)

(56) References Cited

U.S. PATENT DOCUMENTS

| 2011/0226010 A1 | 9/2011 | Baxter |
|---|---|---|
| 2020/0283920 A1 | 9/2020 | Bairamijamal |

OTHER PUBLICATIONS

Nelson, T.O. et al., RTI's solid sorbent-based $CO_2$ capture process: technical and economic lessons learned for application in coal-fired, NGCC, and cement plants, Energy Procedia, Elsevier, NL, vol. 114, Aug. 18, 2017, 2506-2524.

Ray, R. et al., Assessing the cost reduction potential and competitiveness of novel (next generation) UK carbon capture technology benchmarking state-of-the-art and next generation technologies, Oct. 8, 2018, 1-155, retrieved from https://assets.publishing.service.gov.uk/government/uploads/system/uploads/attachment_data/file/864688/BEIS_Final_Benchmarks_Report_Rev_4A.pdf.

Wang, X. et al., Carbon capture from flue gas and the atmosphere: a perspective, Frontiers in Energy Research, vol. 8, Dec. 15, 2020, 1-24.

European Search Report and Written Opinion for corresponding EP 22161775.6, Aug. 23, 2022.

* cited by examiner

PLANT AND METHOD FOR CARRYING OUT AN ENDOTHERMIC CHEMICAL PROCESS AND FOR SEPARATING CARBON DIOXIDE FROM FLUE GAS PRODUCED IN THE PROCESS

CROSS REFERENCE TO RELATED APPLICATIONS

This application claims the benefit of priority under 35 U.S.C. § 119(a) and (b) to European Patent Application No. 22161775.6, filed Mar. 14, 2022, the entire contents of which are incorporated herein by reference.

TECHNICAL FIELD

The invention relates to a plant for carrying out an endothermic chemical process, in particular for the production of synthesis gas, and for separating carbon dioxide from flue gas produced in the process. The invention further relates to a method for carrying out an endothermic chemical process, in particular for the production of synthesis gas, and for separating carbon dioxide from flue gas produced in the process.

BACKGROUND ART

The reduction of carbon dioxide ($CO_2$) emissions in chemical and industrial processes is crucial to mitigate the risks and effects of climate change. It follows that high carbon capture rates are targeted on these processes, typically in excess of 90% of the carbon dioxide formed in the process.

In various endothermic chemical processes, a certain carbon capture rate can be achieved on the process gas, for example produced synthesis gas, in favourable conditions. Those favourable conditions include a high carbon dioxide concentration or partial pressure, high pressure of the process gas, and limited impurities. However, a significant portion of the carbon dioxide emissions are always emitted at lower concentrations and pressures in the flue gas that results from the combustion reaction which supplies the heat for the endothermic process.

Such post combustion gases are typically released to the atmosphere through a smokestack, chimney or exhaust pipe and thus pollute the atmosphere.

For the removal of carbon dioxide from process gases, for example synthesis gas, physically or chemically acting gas scrubbing processes are known which can remove undesirable gas components such as carbon dioxide down to trace amounts. In the case of chemically acting gas scrubbing processes, in particular amines are used as absorption media. Usually, the process gas containing carbon dioxide is brought into contact with the absorption medium in countercurrent flow, whereby carbon dioxide and further sour gases are absorbed by the absorption medium, forming a laden absorption medium. In a subsequent process step, the carbon dioxide and further sour gases are thermally desorbed from the laden absorption medium in a desorption process to obtain a lean or regenerated absorption medium.

A typical setup for a combustion section of a large endothermic chemical process comprises at least one burner, a combustion chamber, a waste heat recovery system, and a compressor, blower or fan upstream of the smokestack. From the smokestack, the flue gas is released to the atmosphere at a certain height and with a temperature that typically exceeds the acid dew point of the flue gas.

For existing plants, which have a smokestack to release the flue gas to the atmosphere, a revamp to include a carbon capture unit upstream of the stack is often costly and entails a plot plan requirement that is not compatible with the existing plant.

SUMMARY

It is one object of the present invention to propose a plant and/or a method which enables the construction of a plant with a carbon dioxide separation unit (carbon capture unit) which is as safe and reliable as possible.

It is one object of the present invention to propose a plant and/or a method which enables the construction of a new plant with a carbon dioxide separation unit (carbon capture unit) which is as safe and reliable as possible.

It is one further or alternative object of the present invention to propose a plant and/or a process which enables the simplest possible extension of an existing plant, in particular an existing plant with a smokestack for flue gases already in place, with a unit for carbon dioxide separation.

A contribution to the at least partial solution of at least one of the above mentioned objects is provided by the subject-matter of the independent claims. The dependent claims provide preferred embodiments which contribute to the at least partial solution of at least one of the objects. Preferred embodiments of elements of a category according to the invention shall, if applicable, also be preferred for components of same or corresponding elements of a respective other category according to the invention.

The terms "having", "comprising" or "containing" etc. do not exclude the possibility that further elements, ingredients etc. may be comprised. The indefinite article "a" or "an" does not exclude that a plurality may be present.

In general, at least one of the underlying problems is at least partially solved by a plant for carrying out an endothermic chemical process, in particular for the production of synthesis gas, and for separating carbon dioxide from flue gas produced in the process, comprising the following operatively connected plant components:

a reactor, comprising a combustion chamber configured to fire an endothermic reaction taking place in a reaction chamber, wherein a hydrocarbon-containing fuel is fired in the combustion chamber with the aid of an oxidant to form a carbon dioxide-containing flue gas stream;

a waste heat recovery unit in fluid connection with the combustion chamber, wherein the waste heat recovery unit is configured to capture heat from the carbon dioxide-containing flue gas stream;

a flue gas compression unit, in particular a blower, in fluid connection with the waste heat recovery unit, wherein the flue gas compression unit is configured to increase the pressure of the carbon dioxide-containing flue gas stream;

a scrubber in fluid connection with the flue gas compression unit, wherein the scrubber is configured to at least partially remove sulphur oxides and/or nitrogen oxides from the carbon dioxide-containing flue gas stream by means of a scrubbing medium, and the scrubber is configured to cool the carbon dioxide-containing flue gas stream by means of the scrubbing medium;

an absorption unit in fluid connection with the scrubber, wherein the absorption unit is configured to absorb carbon dioxide from the carbon dioxide-containing flue gas stream in a chemically acting absorption medium to obtain a carbon dioxide laden absorption medium, and a desorption unit in fluid connection with the absorption unit, wherein the desorption unit is configured to release carbon dioxide from the carbon dioxide laden absorption medium.

In particular, the waste heat recovery unit is arranged downstream of the reactor.

In particular, the flue gas compression unit is arranged downstream of the waste heat recovery unit.

In particular, the scrubber is arranged downstream of the flue gas compression unit.

In particular, the absorption unit is arranged downstream of the scrubber and the desorption unit is arranged downstream of the absorption unit.

The absorption unit and the desorption unit together may also be referred to as "carbon dioxide separation unit" or "carbon capture unit" or "carbon dioxide separation section" or "carbon capture section".

The waste heat recovery unit is configured to capture heat from the carbon dioxide-containing flue gas stream, whereby the carbon dioxide-containing flue gas stream is cooled. In the scrubber, the carbon dioxide-containing flue gas stream is further cooled by means of the scrubbing medium.

BRIEF DESCRIPTION OF THE DRAWINGS

The invention will now be detailed by way of exemplary embodiments and examples with reference to the attached drawings. Unless otherwise stated, the drawings are not to scale. In the figures and the accompanying description, equivalent elements are each provided with the same reference marks.

In the drawings.

DETAILED DESCRIPTION OF THE PREFERRED EMBODIMENTS

Figure 1:
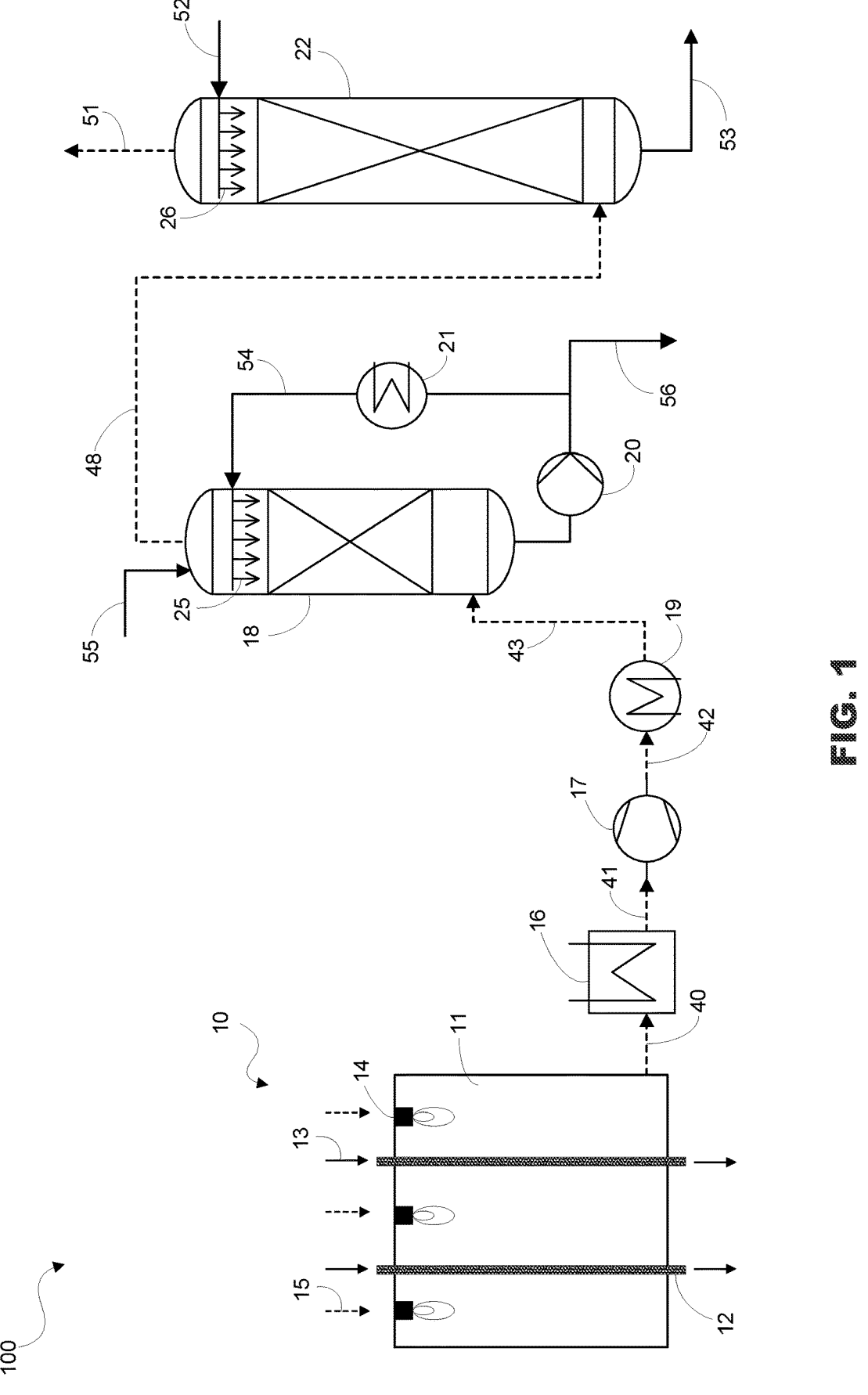
FIG. 1 depicts a first exemplary embodiment 100 of the plant according to the invention.

According to the invention, a flue gas compression unit is arranged downstream of the waste heat recovery unit and upstream of the scrubber, and is in fluid connection with said waste heat recovery unit and said scrubber. The flue gas compression unit is a compressor, blower or fan. Preferably, the flue gas compression unit is a blower.

The flue gas compression unit is preferably configured to overcome the pressure drop in the pre-treatment section and the carbon capture section, which includes at least the scrubber of the pre-treatment section and the absorption unit of the carbon capture section. In the event of failure of the scrubber and/or the absorption unit and/or the desorption unit, the system will continue to operate, since the flue gas compression unit is arranged upstream. For instance, in the event of failure of the scrubber, the flue gas compression unit will not be affected adversely by the rise in temperature and the corresponding increase in the volume flow rate downstream of the scrubber. In this setup, the units downstream of the flue gas compression unit, in particular the scrubber and the absorption unit, will perform the function of a smokestack. In particular, the absorption unit will perform the function of a smokestack. For instance, in the event of failure of the absorption unit, nitrogen oxides and sulfur oxides will still be removed from the flue gas by means of the scrubber. The flue gas pre-treated in this way can, for example, be discharged into the atmosphere at the outlet of the absorption unit until the absorption unit is operating again without having to stop the overall process. The arrangement of the flue gas compression unit according to the invention thus improves the reliability and safety of the plant. The absorption unit is preferably designed so that it can perform the function of a smokestack, thereby foregoing the need to invest in a separate smokestack.

According to one embodiment, the flue gas compression unit is configured to create a negative pressure in the combustion chamber, in particular when the reactor is a steam reformer to convert natural gas and steam to synthesis gas. Accordingly, there is negative pressure on the suction side of the flue gas compression unit, and positive pressure (overpressure) on the pressure side of the flue gas compression unit. In this case, the flue gas compression unit is preferably configured such that the overpressure is sufficient to overcome the pressure drop in the downstream parts of the plant. According to one embodiment, the flue gas compression unit generates a negative pressure of 1 to 100 mbar, preferably 2 to 50 mbar, more preferably 5 to 20 mbar. The term "negative pressure" means a pressure that is negative compared to the prevailing atmospheric pressure, i.e. that is below the prevailing atmospheric pressure, which is e.g. 1013 mbar.

In particular in steam reformers, inspection of the reformer tubes is performed by visual inspection through a viewing window. By generating a slight negative pressure ("vacuum") in the combustion chamber, this ensures that no hot flue gases can escape from the combustion chamber into the external environment while the inspection window is open.

According to one embodiment, the flue gas compression unit is regulated and controlled by measuring the negative pressure in the combustion chamber.

According to one embodiment of the plant according to the invention, the plant is characterized in that no flue gas compression unit is arranged downstream of the scrubber and upstream of the absorption unit.

Preferably, the plant according to the invention comprises one single flue gas compression unit, which is arranged downstream of the waste heat recovery unit and upstream of the scrubber.

The inclusion of an additional flue gas compression unit arranged downstream of the scrubber and upstream of the absorption unit can lead to coupling issues with the upstream flue gas compression unit. With two flue gas compression units in series, it is more difficult to devise a control scheme that avoids the aforementioned coupling issues. Furthermore, rotating machines typically have lower reliability than other types of equipment. The use of two flue gas compression units in series, for example two blowers, thus reduces the overall reliability of the plant.

According to an example, the reactor comprising the combustion chamber and the reaction chamber is a steam reformer or an autothermal reformer. According to an example, the endothermic reaction is the generation of synthesis gas (hydrogen, carbon monoxide and carbon dioxide) from natural gas and steam. The oxidant can be air, oxygen enriched air, or oxygen.

The flue gas compression unit is a unit to increase the pressure of the carbon dioxide-containing flue gas stream discharged from the waste heat recovery unit. For example, the flue gas compression unit is a (gas) compressor, a fan, or a blower. Preferably, the flue gas compression unit is a blower. Preferably, the flue gas compression unit is configured to overcome the pressure drop in the pre-treatment section and the carbon capture section arranged downstream of the flue gas compression unit. The pre-treatment section at least comprises the scrubber. The carbon capture section comprises at least the absorption unit and the desorption unit. The pre-treatment section and the carbon capture section may comprise further elements.

The scrubber has the function of at least partially removing sulphur oxides and/or nitrogen oxides from the flue gas and of cooling the carbon dioxide-containing flue gas stream. In particular, the scrubber is configured to cool the carbon dioxide-containing flue gas stream down to a temperature which corresponds to the operating temperature range of the absorption unit. According to an example, the operating temperature range of the absorption unit is 30° C. to 60° C. For this purpose, the scrubber is operated with a scrubbing medium that has both a high absorption capacity for sulfur oxides and/or nitrogen oxides and a high heat capacity. According to one example, the scrubbing medium is water. Preferably, the scrubbing medium and the carbon dioxide-containing flue gas stream are led in countercurrent flow within the scrubber.

The absorption unit is configured to absorb carbon dioxide from the carbon dioxide containing flue gas stream by means of a chemically acting absorption medium, whereby a carbon dioxide laden absorption medium is obtained in the absorption unit. Preferably, the carbon dioxide-containing flue gas stream and the stream of the absorption medium are led in countercurrent flow within the absorption unit. Preferably, the chemically acting absorption medium contains an amine, a mixture of amines or consists of an amine or a mixture of amines. Such an absorption process is also referred to as amine wash and is known to the skilled person. Further components from the carbon dioxide-containing flue gas stream may be absorbed in the absorption unit by means of the absorption medium, in particular further sour gases, such as hydrogen sulfide. The absorption medium may comprise an amine, such as Monoethanolamine (MEA), Diethanolamine (DEA), Methyldiethanolamine (MDEA), Diglycolamine (DGA), Aminomethyl Propanol (AMP), a promoter such as Piperazine (PZ), or a mixture comprising at least one of the aforementioned. The absorption unit comprises an outlet for releasing the carbon dioxide depleted flue gas or "sweetened" flue gas to the atmosphere. Furthermore, the absorption unit comprises an outlet for the carbon dioxide laden absorption medium, which is in fluid connection with an inlet of the desorption unit.

The desorption unit is in fluid connection with the absorption unit. In particular, the desorption unit is arranged downstream of the absorption unit. The desorption unit is configured to release carbon dioxide from the carbon dioxide laden absorption medium. In the desorption unit or regenerator, the carbon dioxide is released from the absorption medium by use of thermal energy, i.e. heating the absorption medium. Alternatively or additionally, steam can be introduced into the absorption medium to enable or enhance the desorption process. The desorption unit comprises an outlet for discharging the pure carbon dioxide gas from the desorption unit. The pure carbon dioxide gas is subsequently either stored, preferably under pressure, or subject to a further use.

According to one embodiment of the plant according to the invention, the plant comprises a vertically arranged flue gas exhaust pipe, in particular a smokestack, wherein the flue gas exhaust pipe is arranged downstream of the flue gas compression unit and upstream of the scrubber, wherein the flue gas exhaust pipe comprises an upper open end and the flue gas exhaust pipe comprises in a lower region an inlet configured to admit the carbon dioxide-containing flue gas stream into the flue gas exhaust pipe, wherein the inlet of the flue gas exhaust pipe is in fluid connection with an outlet of the flue gas compression unit, and an outlet configured to discharge the carbon dioxide-containing flue gas stream from the flue gas exhaust pipe, wherein the outlet of the flue gas exhaust pipe is in fluid connection with an inlet of the scrubber.

The flue gas exhaust pipe is in fluid connection with the flue gas compression unit via the inlet of the flue gas exhaust pipe. The scrubber, in particular the inlet of the scrubber, is in fluid connection with the flue gas exhaust pipe via an outlet of the flue gas exhaust pipe. The flue gas exhaust pipe comprises an upper open end which on the one hand allows the escape of untreated flue gas, and on the other hand allows the entry of ambient air. Both processes are not desirable, although possible in the case of the aforementioned embodiment.

However, for existing plants with a smokestack already in place, the simplest and most practical solution with regard to a revamp, i.e. the addition of a carbon capture unit, is often to tie in said carbon capture unit on an existing flue gas stack.

In such a case, however, a further flue gas compression unit is often required, which is arranged downstream of the flue gas exhaust pipe and further preferably downstream of the scrubber and upstream of the absorption unit. Hence, according to one embodiment, the plant according to the invention comprises a further flue gas compression unit arranged downstream of the scrubber and upstream of the absorption unit. Said further flue gas compression unit is in fluid connection with the scrubber and the absorption unit. According to an example, said further flue gas compression unit is a (gas) compressor, a blower or a fan. Preferably, said further flue gas compression unit is a blower.

According to one embodiment of the plant according to the invention, the plant comprises a vertically arranged flue gas exhaust pipe, in particular a smokestack, arranged downstream of the flue gas compression unit, the flue gas exhaust pipe comprising an upper open end and the flue gas exhaust pipe comprising, in a lower region, an inlet configured to admit the carbon dioxide-containing flue gas stream into the flue gas exhaust pipe, wherein (a) an outlet of the flue gas compression unit is in fluid connection with the inlet of the flue gas exhaust pipe via a first conduit element and an outlet of the flue gas compression unit is in fluid connection with an inlet of the scrubber via a second conduit element, or (b) an outlet of the flue gas compression unit is in fluid connection with the inlet of the flue gas exhaust pipe via a first conduit element, and an inlet of the scrubber is in fluid connection with the first conduit element via a second conduit element, wherein the second conduit element forms a branch from the first conduit element, or (c) an outlet of the flue gas compression unit is in fluid connection with an inlet of the scrubber via a first conduit element, and the inlet of the flue gas exhaust pipe is in fluid connection with the first conduit element via a second conduit element, wherein the second conduit element forms a branch from the first conduit element.

This embodiment of the plant according to the invention includes three alternatives of how the flue gas compression unit, the scrubber, and the flue gas exhaust pipe can be connected together. Each one of the three alternatives offers the possibility of either directing the carbon dioxide-containing flue gas stream withdrawn from the flue gas compression unit entirely into the flue gas exhaust pipe, or directing it entirely to the scrubber and thus to the carbon capture unit, or dividing it as desired. Furthermore, this embodiment offers the possibility of revamping a plant existing with a flue gas exhaust pipe in such a way that said flue gas exhaust pipe, preferably the smokestack, can be completely separated from the external environment. Any of the foregoing alternatives (a), (b) and (c) allows for closing the inlet to an existing vertically arranged flue gas exhaust pipe, in particular a smokestack, to restrict the flow to the flue gas exhaust pipe, thus preventing air ingress or flue gas bleed.

For instance, according to (a), the first conduit element connecting the outlet of the flue gas compression unit and the inlet of the flue gas exhaust pipe is closed. Hence, the entire carbon dioxide-containing flue gas stream withdrawn from the flue gas compression unit will be routed to the scrubber, whilst no air ingress will occur via the flue gas exhaust pipe.

For instance, according to (b), the first conduit element connecting the outlet of the flue gas compression unit and the inlet of the flue gas exhaust pipe is closed in a region downstream of the connecting point of the first conduit element and the second conduit element. Again, the entire carbon dioxide-containing flue gas stream withdrawn from the flue gas compression unit will be routed to the scrubber, whilst no air ingress will occur via the flue gas exhaust pipe.

For instance, according to (c), the second conduit element connecting the inlet of the flue gas exhaust pipe and the first conduit element is closed. Again, the entire carbon dioxide-containing flue gas stream withdrawn from the flue gas compression unit will be routed to the scrubber, whilst no air ingress will occur via the flue gas exhaust pipe.

Alternative (b) of this embodiment is particularly preferred because an existing plant may already have a fluid connection between a flue gas compression unit and a flue gas exhaust pipe. It is then sufficient to create a branch, which is the second conduit element, from this existing connection, which is the first conduit element.

The aforementioned embodiment is preferred over that embodiment of the invention in which the scrubber is connected to an outlet of the flue gas exhaust pipe, i.e. wherein the flue gas exhaust pipe is arranged downstream of the flue gas compression unit and upstream of the scrubber, wherein the flue gas exhaust pipe comprises an upper open end and the flue gas exhaust pipe comprises in a lower region an inlet configured to admit the carbon dioxide-containing flue gas stream into the flue gas exhaust pipe, wherein the inlet of the flue gas exhaust pipe is in fluid connection with an outlet of the flue gas compression unit, and an outlet configured to discharge the carbon dioxide-containing flue gas stream from the flue gas exhaust pipe, wherein the outlet of the flue gas exhaust pipe is in fluid connection with an inlet of the scrubber.

Because the absence of air ingress, and thus oxygen ingress, ensures a lower degradation rate of the chemically acting absorbent in the absorption unit. This is particularly true of amines as chemically acting absorption media, since the amino group is easily oxidized by oxygen or other oxidizing agents. Furthermore, the prevention of flue gas losses ensures that the full processing of the carbon dioxide-containing flue gas stream by the carbon capture unit is achievable, with the consequence that the capture rate required on the carbon capture unit can be decreased. Furthermore, in the event of failure of the scrubber, the blower is unaffected since it is arranged upstream of the scrubber. The fluid connection to the flue gas exhaust pipe may then be opened, and the fluid connection to the scrubber may then be closed, so that the whole carbon dioxide-containing flue gas stream is routed to the flue gas exhaust pipe, thus allowing the main process to keep running, providing the possibility to carry out online maintenance on the carbon capture section or the pre-treatment section (e.g. the scrubber), and ensuring that relatively hot flue gas withdrawn from the waste heat recovery unit, is not sent to an absorption unit designed to operate at low temperatures of e.g. 30° C. to 60° C.

The term "lower region" of the vertically arranged flue gas means a region which is so significantly removed from the upper open end of the vertically arranged flue gas exhaust pipe that the flue gas exhaust pipe, in particular the smokestack, can perform its function as a vertically arranged flue gas exhaust pipe. In particular, the term "lower area" means an area of the vertically arranged flue gas exhaust pipe that is close to the ground.

The term "vertically arranged" means vertically arranged or essentially vertically arranged.

The term "conduit element" means a pipe or conduit or any other device through which the carbon dioxide-containing flue gas stream can be passed. The "conduit element" may comprise further elements arranged within such a conduit element, which are no "conduit elements" per se. That is, elements which enable a fluid connection within the conduit element, for example a heat exchanger or any other device through which the carbon dioxide-containing flue gas stream can be passed.

For the foregoing embodiment, it is particularly critical that the flow of carbon dioxide-containing flue gas stream via the first conduit element and/or second conduit element be directed either entirely to the scrubber, or entirely to the vertically arranged flue gas exhaust pipe, or split between the vertically arranged flue gas exhaust pipe and the scrubber according to process requirements.

Therefore, according to one embodiment of the plant according to the invention, at least one control device is arranged within the first conduit element and/or at least one control device is arranged within the second conduit element, wherein the at least one control device is configured to control the flue gas volume flow admitted to the flue gas exhaust pipe and/or admitted to the scrubber.

Preferably, at least one control device is arranged within the first conduit element and at least one control device is arranged within the second conduit element, wherein the control device arranged within the first conduit element is configured to control the flue gas volume flow admitted to flue gas exhaust pipe or admitted to the scrubber and the control device arranged within the second conduit element is configured to control the flue gas volume flow admitted to flue gas exhaust pipe or admitted to the scrubber. Whether the control device arranged within the first and/or second conduit element controls the flow of the carbon dioxide-containing flue gas stream admitted to the scrubber or the vertically arranged flue gas exhaust pipe depends on the configuration of the plant, that is the configuration according to alternative (a), (b), or (c).

It is also possible that one (common) control device is arranged within the first and second conduit element, which is configured to control the volume flow of the carbon dioxide-containing flue gas stream admitted to the scrubber and the vertically arranged flue gas exhaust pipe.

The control device may be selected from the group of elements comprising gate valves, butterfly valves, plugs, shut-off valves, control valves or any other device which is suitable to control the flow of the carbon dioxide-containing flue gas through the corresponding conduit element. Preferably, the control device is a control valve.

According to one embodiment of the plant according to the invention, a heat exchange device is arranged upstream of the scrubber, wherein the heat exchange device is configured to cool the carbon dioxide-containing flue gas stream, in particular to cool the carbon-dioxide containing flue gas stream to a temperature below its acid dew point.

According to one embodiment, the heat exchange device is arranged upstream of the scrubber and downstream of the waste heat recovery unit. Hence, the carbon dioxide-containing flue gas stream is further cooled by means of the heat exchange device after it has been cooled in the waste heat recovery unit. The carbon dioxide-containing flue gas stream will be further cooled by means of the scrubber which is arranged downstream of said heat exchange device. According to one further embodiment, the heat exchange device is arranged upstream of the scrubber and downstream of the flue gas compression unit.

According to one embodiment, the heat exchange device is a heat exchanger, for example a shell and tube heat exchanger, a plate heat exchanger or a pillow plate heat exchanger.

Preferably, the heat exchanger device is made at least in part, particularly with respect to the flue gas-carrying parts, of a corrosion-resistant material, for example, a composite comprising a polymer and a reinforcing element (e.g., glass fiber or carbon fiber).

Using the heat exchange device according to the foregoing embodiment has the additional benefit of condensation of sulphuric acid in the heat exchanger itself, thereby preventing formation of sulphuric acid aerosols which might cause problems in the carbon capture section in case the sulphur oxides, in particular sulphur trioxide, are not entirely removed or are not removed at all in the scrubber due to a malfunction of the scrubber. Hence, the carbon dioxide-containing flue gas stream is preferably cooled in the heat exchange device to a temperature which is below its acid dew point, in particular a temperature which is below its acid dew point in view of sulphuric acid.

In general, at least one of the underlying problems is at least partially solved by a method for carrying out an endothermic chemical process, in particular for the production of synthesis gas, and for separating carbon dioxide from flue gas produced in the process, comprising the method steps of carrying out an endothermic reaction in a reaction chamber, and firing the endothermic reaction by means of burning a hydrocarbon-containing fuel in a combustion chamber with the aid of an oxidant, whereby a carbon dioxide-containing flue gas stream is formed in the combustion chamber;

capturing heat from the carbon dioxide-containing flue gas stream withdrawn from the combustion chamber by means of a waste heat recovery unit;

compressing the carbon dioxide-containing flue gas stream withdrawn from the waste heat recovery unit by means of a flue gas compression unit, in particular by means of a blower;

at least partially removing sulphur oxides and/or nitrogen oxides from the carbon dioxide-containing flue gas stream withdrawn from the flue gas compression unit by means of a scrubbing medium in a scrubber, and cooling of the carbon dioxide-containing flue gas stream withdrawn from the flue gas compression unit by means of the scrubbing medium in the scrubber;

absorbing carbon dioxide of the carbon dioxide containing flue gas stream withdrawn from the scrubber by means of a chemically acting absorption medium in an absorption unit, wherein a carbon dioxide laden absorption medium is obtained, and withdrawing carbon dioxide depleted flue gas from the absorption unit, and subsequently releasing carbon dioxide from the carbon dioxide laden absorption medium by means of a desorption unit arranged downstream of the absorption unit.

Advantages and features which have been described in connection with embodiments of the plant according to the invention are equally applicable to corresponding embodiments of the method according to the invention.

"Corresponding embodiment" means in this context that the embodiment of the method has technical method/process features which have the same properties or have the same effect as the corresponding plant/device feature.

According to one embodiment of the method according to the invention, the carbon dioxide-containing flue gas withdrawn from the flue gas compression unit is admitted to a vertically arranged flue gas exhaust pipe, in particular a smokestack, wherein the flue gas exhaust pipe is arranged downstream of the flue gas compression unit and upstream of the scrubber, and wherein the flue gas exhaust pipe comprises an upper open end, and wherein the carbon-containing flue gas is admitted to the flue gas exhaust pipe by means of an inlet located in a lower region of the flue gas exhaust pipe, and wherein the carbon dioxide containing flue gas is withdrawn from the flue gas exhaust pipe by means of an outlet located in the lower region of the flue gas exhaust pipe.

According to the foregoing embodiment of the method, the vertically arranged flue gas exhaust pipe and the scrubber are arranged in series.

According to one embodiment of the method according to the invention, the carbon dioxide-containing flue gas stream withdrawn from the flue gas compression unit is admitted to a vertically arranged flue gas exhaust pipe, in particular a smokestack, wherein the flue gas exhaust pipe is arranged downstream of the flue gas compression unit, and wherein the flue gas exhaust pipe comprises an upper open end, and wherein the carbon-containing flue gas is admitted to the flue gas exhaust pipe by means of an inlet located in a lower region of the flue gas exhaust pipe, and/or is admitted to the scrubber by means of an inlet of the scrubber, wherein the flue gas exhaust pipe and the scrubber are arranged parallel to each other, so that the complete stream of the carbon dioxide-containing flue gas withdrawn from the flue gas compression unit is admitted to the flue gas exhaust pipe or the scrubber, or a partial stream of the carbon dioxide-containing flue gas withdrawn from the flue gas compression unit is admitted to the flue gas exhaust pipe and a partial stream of the carbon dioxide-containing flue gas withdrawn from the flue gas compression unit is admitted to the scrubber.

According to one embodiment of the method according to the invention, the volume flow of the carbon dioxide-containing flue gas stream withdrawn from the flue gas compression unit and admitted to the flue gas exhaust pipe and/or the scrubber is controlled by means of at least one control device, wherein the at least one control device is arranged downstream of the flue gas compression unit and upstream of the flue gas exhaust pipe and/or is arranged downstream of the flue gas compression unit and upstream of the scrubber.

According to one embodiment of the method according to the invention, the carbon dioxide-containing flue gas stream withdrawn from the flue gas compression unit is further cooled by means of a heat exchange device, in particular cooled to a temperature below its acid dew point, and wherein the heat exchange device is arranged upstream of the scrubber.

According to one embodiment of the method according to the invention, the carbon dioxide-containing flue gas stream withdrawn from the scrubber is not compressed before it is admitted to the absorption unit.

According to one embodiment of the method according to the invention, the flue gas compression unit creates a negative pressure in the combustion chamber, in particular a negative pressure of 1 to 100 mbar, preferably 2 to 50 mbar, more preferred 5 to 20 mbar.

The exemplary embodiments 100, 200 and 300 of the plant according to the invention are configured to perform at least one embodiment of the method according to the invention.

In the figures, conduits carrying flue gas (conduits 40 to 51) are shown with dashed lines, while conduits carrying liquids (conduits 52 to 56) are shown with solid lines.

FIG. 1 shows a first exemplary embodiment of a plant 100 according to the invention.

The plant 100 includes a reactor 10 configured to perform an endothermic chemical process. As shown in FIG. 1, the reactor 10 is a steam reformer for producing synthesis gas from a process gas 13. The process gas 13 is a natural gas-steam mixture. The endothermic reaction takes place in the reaction chambers 12, which have the shape of typical reformer tubes. The reaction chambers 12 are fired by burners 14, which are supplied with a mixture of a fuel-oxidant mixture 15 which contains hydrocarbons and air. The burners 14 are arranged within a combustion chamber 11 and generate flames directed from top to bottom for firing the reaction chambers 12.

The flue gas produced during combustion of the fuel containing hydrocarbons is withdrawn from the combustion chamber 11 of the reactor 10 via a conduit 40 and first fed to a waste heat recovery unit 16, in which the flue gas containing carbon dioxide is cooled to about 140° C., above the dew point of sulphuric acid. The heat energy transferred during cooling of the flue gas from conduit 40 can be used, for example, to generate steam. The cooled flue gas is withdrawn from the waste heat recovery unit 16 via conduit 41 and compressed to a pressure in the range of 80 to 150 mbar above ambient pressure by a flue gas compression unit, here designed as a blower 17, and the compressed carbon dioxide-containing flue gas is conveyed further via conduit 42. The blower 17 is connected upstream of the pre-treatment section of the plant and the actual carbon dioxide separation section (or carbon capture section) of the plant. According to the example of plant 100, the pre-treatment section of the plant 100 includes a heat exchanger 19 and a scrubber 18. The carbon dioxide separation section includes an absorption unit 26, and a desorption unit (not shown). The absorption unit 26 and the desorption unit are configured to first chemically absorb and then desorb carbon dioxide from the flue gas by means of a chemically acting absorption medium, in particular an amine. In the event of a failure of the scrubber 18, or the absorption unit 22, or the desorption unit, the blower 17 is designed to compensate for the pressure drop across the pipes and apparatuses downstream of the blower 17, so that the plant components arranged downstream of the blower 17 effectively act as a smoke-stack. In such a case, untreated or partly treated flue gas will be discharged via conduit 51 from the absorption unit 22.

In the heat exchanger 19, the carbon dioxide-containing flue gas is further cooled to a temperature of 70-90° C. In particular, the heat exchanger 19 has the objective of cooling the carbon dioxide-containing flue gas stream to such an extent that sulfur oxides, especially highly hygroscopic sulfur trioxide, can be condensed as sulfuric acid, which is subsequently separated from the flue gas stream (condenser and separator not shown). Removal of the sulfuric acid at this point prevents the formation of sulfuric acid aerosols, which would generate problems in the absorption unit 22 and desorption unit in the event that the scrubber fails. Further, the heat exchanger cools the flue gas stream sufficiently that it would not cause severe problems in the absorption unit 22 in the event that the scrubber failed. Since the absorption unit 22 and the downstream desorption unit are designed for a flue gas stream temperature of 30° C. to 60° C., greater damage to the absorption unit 22 and the desorption unit can thus be averted should the scrubber 18 fail. The heat exchanger 19 thus increases the safety of the plant in the event that the scrubber 18 fails or is otherwise not fully functional. The heat exchanger 19 can also be placed upstream of the blower 17.

The flue gas stream withdrawn from the heat exchanger 19 is continued via conduit 43 and enters the scrubber 18 in a lower area of the latter. In the scrubber 18, the flue gas stream flows from the bottom to the top, while a scrubbing medium 25 flows from the top to the bottom via a distributor arranged in the head section of the scrubber 18. The flue gas stream and the scrubbing medium 25 are thus guided in countercurrent flow in the scrubber 18. Water can be used as the scrubbing medium 25, but depending on the requirements and flue gas composition, the scrubbing medium 25 can also be a solution or suspension, for example a caustic solution or milk of lime for improved binding of sulfur oxides. At the head section of the scrubber, fresh scrubbing medium is fed in via conduit 55. Used, i.e. already contaminated, scrubbing medium is recirculated via conduit 54 and circulation pump 20 and thus returned to the head section of the scrubber 18. At the same time, the scrubbing medium is cooled to a predefined target temperature by means of the heat exchanger 21 in order to increase the capacity for dissolving sulfur oxides and/or nitrogen oxides in the scrubbing medium. Part of the used scrubbing medium is discharged from the circuit via conduit 56 and subjected to further processing. The quantity of used scrubbing medium discharged via conduit 56 corresponds to the quantity of fresh scrubbing medium supplied via conduit 55.

In the scrubber 18, the flue gas stream entering via conduit 43 is cooled, and the cooled flue gas stream is discharged from the scrubber 18 via the conduit 48 having a temperature which is within the design range (30° C. to 60° C.) of the absorption unit 22 for the flue gas stream.

In the scrubber 18, which forms part of the pre-treatment section of the plant 100, the carbon dioxide-containing flue gas stream is at least partially depleted of sulfur oxides and/or nitrogen oxides. The pre-treatment section of the plant 100 may comprise further devices for flue gas purification, such as, for example, a device for the selective catalytic reduction of nitrogen oxides in the sense of a comproportionation reaction with the aid of urea compounds, in which elemental nitrogen is eventually formed from the nitrogen oxides.

The carbon dioxide-containing flue gas, which is depleted in sulfur oxides and/or nitrogen oxides, is conveyed further via conduit 48 and enters the absorption unit 22 in a lower region thereof. The absorption unit 22 comprises an absorption column and is particularly provided with packing material such as structured packing to increase the internal surface area of the absorption column. In the absorption unit 22, the carbon dioxide-containing flue gas stream flows from the bottom to the top and the absorption medium 26 flows from the top to the bottom. The flue gas stream and the absorption medium stream are thus guided in countercurrent flow within the absorption unit 22. Lean absorption medium, for example a slightly alkaline amine solution, is fed to the head section of the absorption unit 22 via conduit 52 and distributed over the entire cross section of the absorption column via a distributor in the head section of the absorption unit 22. Carbon dioxide contained in the flue gas stream is reversibly chemically bound to the absorption medium. Absorption medium loaded with carbon dioxide is withdrawn from the sump of the absorption unit 22 via conduit 53 and fed to the downstream desorption unit, which is not shown here for reasons of clarity. A flue gas stream which is now at least depleted in carbon dioxide or free of carbon dioxide is withdrawn from the top of the absorption unit 22 via conduit 51. In the desorption unit, the carbon dioxide bound to the laden absorption medium is desorbed by heating and/or steam injection and is thus recovered in a highly concentrated form. The carbon dioxide thus obtained in the process can be further compressed and then sent for further use or storage. The lean absorption medium regenerated in the desorption unit is then fed again to the absorption unit 22 via conduit 52.

The exemplary embodiment of the plant 100 according to FIG. 1 is particularly suitable for new plants which are to be equipped with a carbon dioxide separation unit for the separation of carbon dioxide from flue gas streams.

Figure 2:
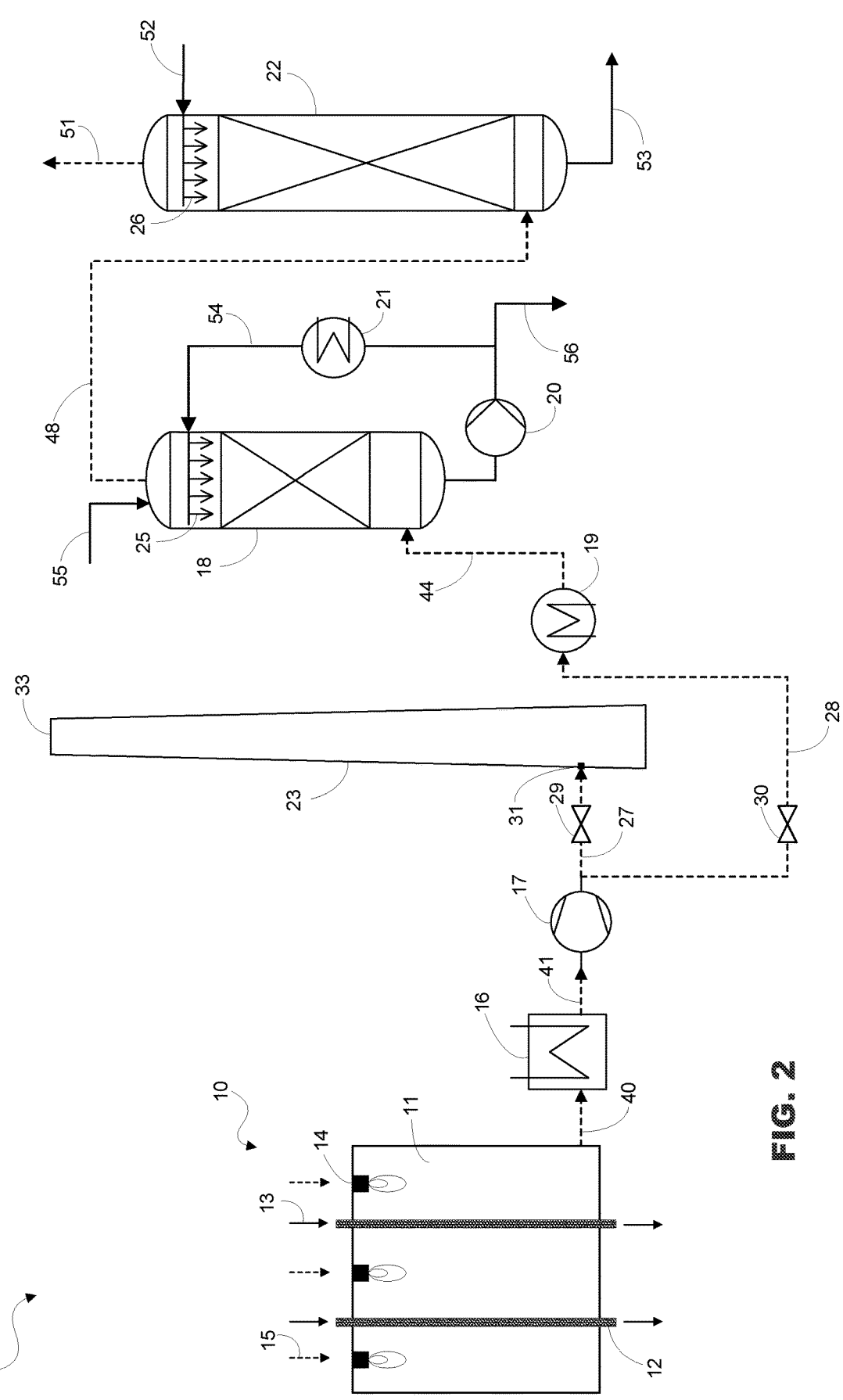
FIG. 2 depicts a second exemplary embodiment 200 of the plant according to the invention.

The exemplary embodiment of the plant 200 according to FIG. 2 is particularly suitable for retrofitting existing plants which are already equipped with a smokestack for discharging carbon dioxide-containing flue gases to the atmosphere, but which do not yet comprise a unit for separating carbon dioxide from these flue gases.

The embodiment of the plant according to the invention as shown in FIG. 2 is described in more detail below, whereby the differences from the embodiment as shown in FIG. 1 are pointed out.

In contrast to the plant 100 according to FIG. 1, the exemplary embodiment of the plant 200 according to FIG. 2 additionally has a vertically arranged flue gas exhaust pipe, here designed as a smokestack 23. The smokestack 23 is arranged downstream of the flue gas compression unit, i.e. the blower 17 and is fluidically connected thereto via a first conduit element 27. The first conduit element 27 provides a fluidic connection between an outlet (not shown) of the blower 17 and an inlet 31 of the smokestack 23. Furthermore, the plant 200 according to FIG. 2 has a second conduit element 28 which forms a branch from the first conduit element 27. Flue gas withdrawn from the blower 17 can thereby either be directed to the smokestack 23 via the first conduit element 27, or be directed to the scrubber 18 via the second conduit element 28 and further via the conduit 44. It is also possible to divide the carbon dioxide-containing flue gas stream withdrawn from the blower 17 between the two conduit elements 27 and 28, i.e. to route part of the flue gas stream to the smokestack 23 and to route part of the flue gas stream to the scrubber 18. Whether the flue gas stream is directed to the smokestack 23 or to the scrubber 18, or to both units, can be controlled by the control valves 29 and 30 arranged in the first conduit element 27 and second conduit element 28.

During normal operation of the plant 200, the control valve 29 is fully closed and the control valve 30 is fully open so that the carbon dioxide-containing flue gas stream is fully routed to the pre-treatment section (heat exchanger 19 and scrubber 18) and to the carbon dioxide separation section (absorption unit 22 and desorption unit not shown). In the event of a malfunction of the scrubber 18 and/or the absorption unit 22 and/or the desorption unit, the control valve 30 is closed and the control valve 29 is opened. As long as the untreated flue gas is discharged to the atmosphere through the smokestack 23, appropriate maintenance or repair work can be carried out on the plant components which are arranged downstream of the second conduit element 28. This is virtually made possible by the fact that the scrubber 18 and the absorption unit 22 (and the desorption unit) are arranged parallel to the smokestack 23 and the presence of the control valves 29 and 30. The control valves 29 and 30 could also be replaced by simple shut-off devices, such as gate valves, if it is only a matter of choosing between the two "routes".

As mentioned above, the configuration according to plant 200 is particularly suitable for the extension of an existing plant which already has a smokestack 23. The smokestack 23 has an upper open end from which flue gases can be released to the atmosphere. Furthermore, the smokestack 23 has an inlet 31 in its lower region via which the first conduit element 27 fluidly connects the smokestack 23 to the flue gas compression unit 17. In an existing installation, an inlet 31, a first conduit element 27 and a blower 17 are already present, so that it is particularly easy to enable a corresponding configuration with carbon dioxide separation unit by means of a branch as in FIG. 2 via a second conduit element 28 and the addition of appropriate valves or, in the even simpler case, shut-off devices.

The operation of the scrubber 18 and the absorption unit 22, as well as the desorption unit not shown, correspond to the operation of the corresponding devices as described in detail for FIG. 1.

Figure 3:
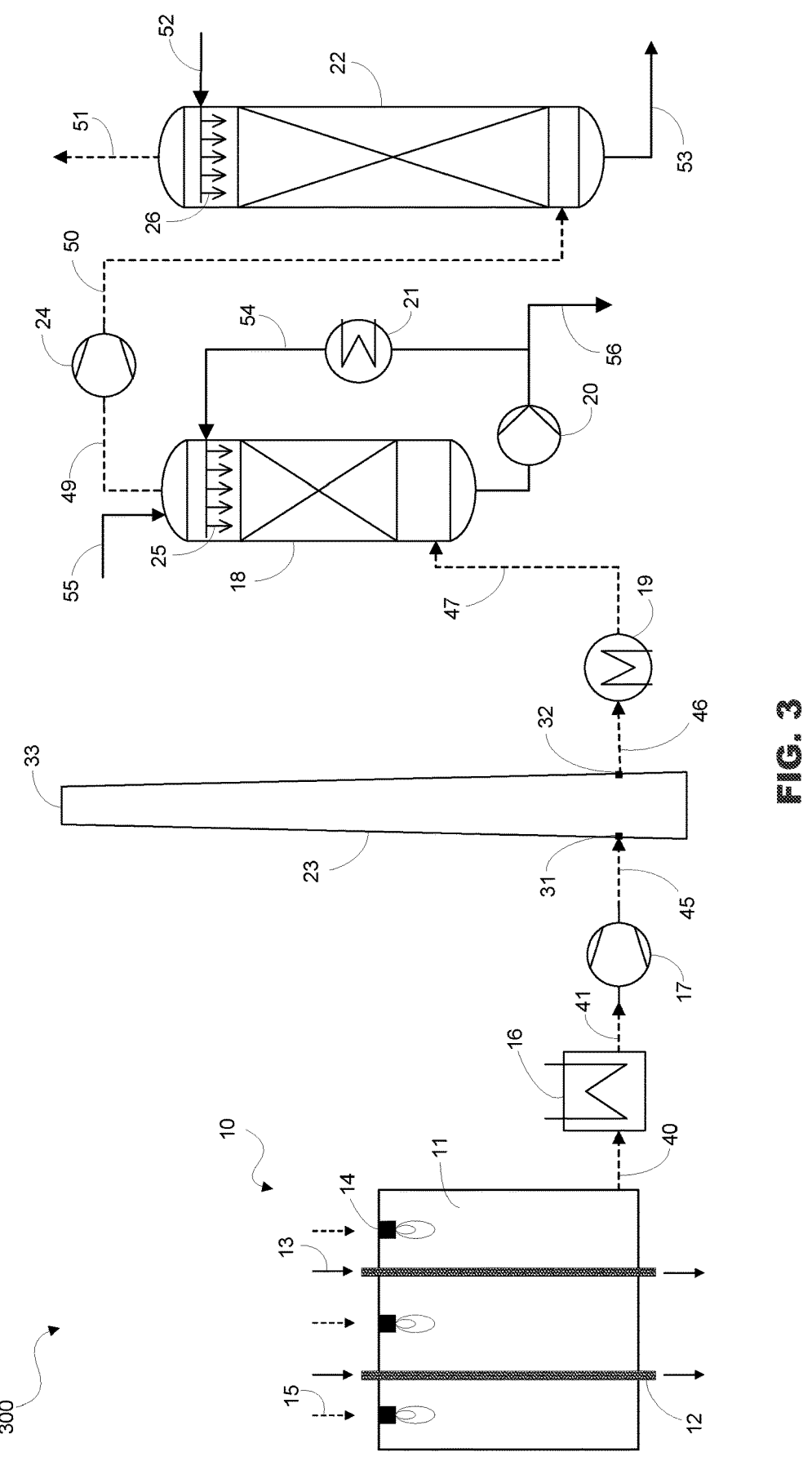
FIG. 3 depicts a third exemplary embodiment 300 of the plant according to the invention.

The exemplary embodiment of the plant 300 according to FIG. 3 is particularly suitable for retrofitting existing plants which are already equipped with a smokestack for discharging carbon dioxide-containing flue gases to the atmosphere, but which do not comprise a unit for separating carbon dioxide from these flue gases.

The embodiment of the plant according to the invention as shown in FIG. 3 is described in more detail below, whereby the differences from the embodiment as shown in FIGS. 1 and 2 are pointed out.

The configuration of the plant 300 as shown in FIG. 3 is also particularly suitable for retrofitting plants which already have a smokestack for flue gas but are not yet equipped with a unit for separating carbon dioxide from the flue gas. In contrast to the plant 200 shown in FIG. 2, the plant 300 shown in FIG. 3 is of open design, i.e. there is constant contact with the external environment via the upper open end 33 of the smokestack 23.

A lower region of the smokestack 23 is fluidically connected to the blower 17 via an inlet 31 and conduit 45, and fluidically connected to the scrubber 18 via an outlet 32 and conduits 46 and 47. The flue gas stream of conduit 45 is admitted to the smokestack 23 via inlet 31 and discharged from the smokestack 23 via outlet 32. In addition, a heat exchanger 19 is connected between the smokestack 23 and the scrubber 18. The scrubber 18 is fluidically connected to the absorption unit 22 via conduits 49 and 50. Since an additional pressure loss occurs due to the upper open end 33 of the smokestack 23, it is advantageous according to the configuration of the plant 300 as shown in FIG. 3 to connect an additional blower 24 between the scrubber 18 and the absorption unit 22. This ensures that the pressure of the flue gas flow at the inlet of the absorption unit 22 is high enough.

The open upper end 33 of the smokestack 23, which is always present during operation of the plant 300 according to this configuration, has the disadvantage that part of the flue gas stream from conduit 45 is always lost via the smokestack 23. In addition, the entry of false air via the smokestack 23 can cause problems in the absorption unit 22 and the desorption unit (not shown) downstream of it, since amines in particular are easily oxidizable as absorbents and therefore react sensitively to oxygen.

However, the embodiment of FIG. 3 also has the advantage that, depending on the space available in an existing plant, it is often easiest to simply connect a unit for separating carbon dioxide from flue gas to an existing smokestack. In other words, it can be impractical to install a carbon capture unit upstream of the smokestack, since it may require a more costly revamp, as well as a plot plan requirement that is incompatible with the design of the existing unit. However, it has to be pointed out that those problems are least in part overcome by the configuration of the plant 200 according to FIG. 2.

The advantages of a unit 200 as configured according to FIG. 2 over a unit 300 as configured according to FIG. 3 are illustrated by the following table.

It is thereby assumed that 3% of the flue gas stream is lost via the smokestack 23 according to the configuration in FIG. 3 (plant 300). Furthermore, it is assumed that conduit 27 to smokestack 23 as shown in FIG. 2 (plant 200) is closed and conduit 28 to scrubber 18 is fully open.

LIST OF REFERENCE SIGNS 100, 200, 300 plant
10 reactor
11 combustion chamber
12 reaction chamber
13 process gas
14 burner
15 hydrocarbon containing fuel and oxidant
16 waste heat recovery unit
17 blower (flue gas compression unit)
18 scrubber
19 heat exchanger
20 circulation pump
21 heat exchanger
22 absorption unit
23 smokestack (vertically arranged flue gas exhaust pipe)
24 blower
25 scrubbing medium
26 absorption medium
27 first conduit element
28 second conduit element
29 valve (control device)
30 valve (control device)
31 smokestack inlet
32 smokestack outlet
33 upper open end of smokestack
40-50 conduit (for carbon dioxide-containing flue gas)
51 conduit (for carbon dioxide depleted flue gas)
52 conduit (for lean amine absorption medium)
53 conduit (for laden amine absorption medium)
54 conduit (for recirculated scrubbing medium)
55 conduit (for fresh scrubbing medium)
56 conduit (for contaminated scrubbing medium)

It will be understood that many additional changes in the details, materials, steps and arrangement of parts, which have been herein described in order to explain the nature of the invention, may be made by those skilled in the art within

| | Flue gas | Flue gas losses to smokestack | Flue gas to absorption unit inlet | Target overall carbon dioxide removed | Required capture rate for carbon capture unit | Specific regeneration energy for amine wash unit (AMP + PZ [1]) (MJ/t $CO_2$) |
|---|---|---|---|---|---|---|
| Example 1 (plant 200, FIG. 2) | 100.0 | 0.0 | 100.0 | 95.0 | 95.0 | 2990 |
| Example 2 (plant 300, FIG. 3) | 100.0 | 3.0 | 97.0 | 95.0 | 97.9 | 3220 |

[1] mixture of Aminomethyl Propanol and Piperazine

The regeneration energy of amine wash solvents used for the chemical absorption of carbon dioxide increases rapidly above a carbon dioxide recovery rate of 95%. Assuming that an overall capture rate of 95% is targeted a threshold that is often prescribed, and that there is 3% loss of flue gas to the smokestack, a carbon dioxide removal rate of nearly 98% would be required on the carbon dioxide separation unit (carbon capture unit) to achieve the overall capture rate of 95%, thereby incurring a significant energy penalty as shown in the table above in terms of regeneration energy.

It is understood that the advantage expressed by Example 1 also applies to the same extent to the configuration of the plant according to FIG. 1 (Plant 100).

the principle and scope of the invention as expressed in the appended claims. Thus, the present invention is not intended to be limited to the specific embodiments in the examples given above.

What is claimed is:

1. A method for carrying out an endothermic chemical process and for separating carbon dioxide from flue gas produced in the process, comprising the method steps of carrying out an endothermic reaction in a reaction chamber, and firing the endothermic reaction by means of burning a hydrocarbon-containing fuel in a combustion chamber with the aid of an oxidant, whereby a carbon dioxide-containing flue gas stream is formed in the combustion chamber;

capturing heat from the carbon dioxide-containing flue gas stream withdrawn from the combustion chamber by means of a waste heat recovery unit;

compressing the carbon dioxide-containing flue gas stream withdrawn from the waste heat recovery unit by means of a flue gas compression unit;

at least partially removing sulphur oxides and/or nitrogen oxides from the carbon dioxide-containing flue gas stream withdrawn from the flue gas compression unit by means of a scrubbing medium in a scrubber, and cooling of the carbon dioxide-containing flue gas stream withdrawn from the flue gas compression unit by means of the scrubbing medium in the scrubber;

absorbing carbon dioxide of the carbon dioxide containing flue gas stream withdrawn from the scrubber by means of a chemically acting absorption medium in an absorption unit, wherein a carbon dioxide laden absorption medium is obtained, and withdrawing carbon dioxide depleted flue gas from the absorption unit, and subsequently releasing carbon dioxide from the carbon dioxide laden absorption medium by means of a desorption unit arranged downstream of the absorption unit, further wherein the carbon dioxide-containing flue gas withdrawn from the flue gas compression unit is admitted to a vertically arranged flue gas exhaust pipe, wherein the flue gas exhaust pipe is arranged downstream of the flue gas compression unit and upstream of the scrubber, and wherein the flue gas exhaust pipe comprises an upper open end, and wherein the carbon-containing flue gas is admitted to the flue gas exhaust pipe by means of an inlet located in a lower region of the flue gas exhaust pipe, and wherein the carbon dioxide containing flue gas is withdrawn from the flue gas exhaust pipe by means of an outlet located in the lower region of the flue gas exhaust pipe.

2. The method according to claim 1, wherein the carbon dioxide-containing flue gas stream withdrawn from the flue gas compression unit is further cooled by means of a heat exchange device, and wherein the heat exchange device is arranged upstream of the scrubber.

3. The method according to claim 1, wherein the carbon dioxide-containing flue gas stream withdrawn from the scrubber is not compressed before it is admitted to the absorption unit.

4. The method according to claim 1, wherein the flue gas compression unit creates a negative pressure in the combustion chamber.

5. A method for carrying out an endothermic chemical process and for separating carbon dioxide from flue gas produced in the process, comprising the method steps of carrying out an endothermic reaction in a reaction chamber, and firing the endothermic reaction by means of burning a hydrocarbon-containing fuel in a combustion chamber with the aid of an oxidant, whereby a carbon dioxide-containing flue gas stream is formed in the combustion chamber:

capturing heat from the carbon dioxide-containing flue gas stream withdrawn from the combustion chamber by means of a waste heat recovery unit;

compressing the carbon dioxide-containing flue gas stream withdrawn from the waste heat recovery unit by means of a flue gas compression unit;

18 at least partially removing sulphur oxides and/or nitrogen oxides from the carbon dioxide-containing flue gas stream withdrawn from the flue gas compression unit by means of a scrubbing medium in a scrubber, and cooling of the carbon dioxide-containing flue gas stream withdrawn from the flue gas compression unit by means of the scrubbing medium in the scrubber;

absorbing carbon dioxide of the carbon dioxide containing flue gas stream withdrawn from the scrubber by means of a chemically acting absorption medium in an absorption unit, wherein a carbon dioxide laden absorption medium is obtained, and withdrawing carbon dioxide depleted flue gas from the absorption unit, and subsequently releasing carbon dioxide from the carbon dioxide laden absorption medium by means of a desorption unit arranged downstream of the absorption unit, further wherein the carbon dioxide-containing flue gas stream withdrawn from the flue gas compression unit is admitted to a vertically arranged flue gas exhaust pipe, wherein the flue gas exhaust pipe is arranged downstream of the flue gas compression unit, and wherein the flue gas exhaust pipe comprises an upper open end, and wherein the carbon-containing flue gas is admitted to the flue gas exhaust pipe by means of an inlet located in a lower region of the flue gas exhaust pipe, and/or is admitted to the scrubber by means of an inlet of the scrubber, wherein the flue gas exhaust pipe and the scrubber are arranged parallel to each other, so that the complete stream of the carbon dioxide-containing flue gas withdrawn from the flue gas compression unit is admitted to the flue gas exhaust pipe or the scrubber, or a partial stream of the carbon dioxide-containing flue gas withdrawn from the flue gas compression unit is admitted to the flue gas exhaust pipe and a partial stream of the carbon dioxide-containing flue gas withdrawn from the flue gas compression unit is admitted to the scrubber.

6. The method according to claim 5, wherein the volume flow of the carbon dioxide-containing flue gas stream withdrawn from the flue gas compression unit and admitted to the flue gas exhaust pipe and/or the scrubber is controlled by means of at least one control device, wherein the at least one control device is arranged downstream of the flue gas compression unit and upstream of the flue gas exhaust pipe and/or is arranged downstream of the flue gas compression unit and upstream of the scrubber.

7. The method according to claim 5, wherein the carbon dioxide-containing flue gas stream withdrawn from the flue gas compression unit is further cooled by means of a heat exchange device, and wherein the heat exchange device is arranged upstream of the scrubber.

8. The method according to claim 5, wherein the carbon dioxide-containing flue gas stream withdrawn from the scrubber is not compressed before it is admitted to the absorption unit.

9. The method according to claim 5, wherein the flue gas compression unit creates a negative pressure in the combustion chamber.

* * * * *